J. H. AUBLE.
LAWN MOWER.
APPLICATION FILED SEPT. 11, 1905.
929,814.
Patented Aug. 3, 1909.
2 SHEETS—SHEET 1.
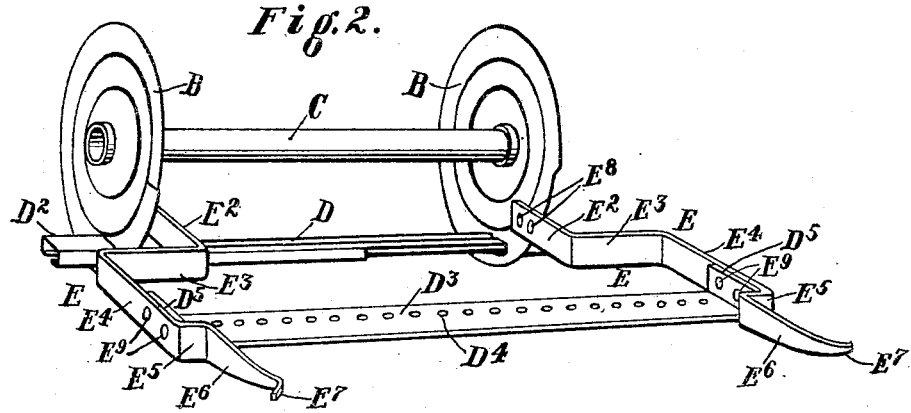
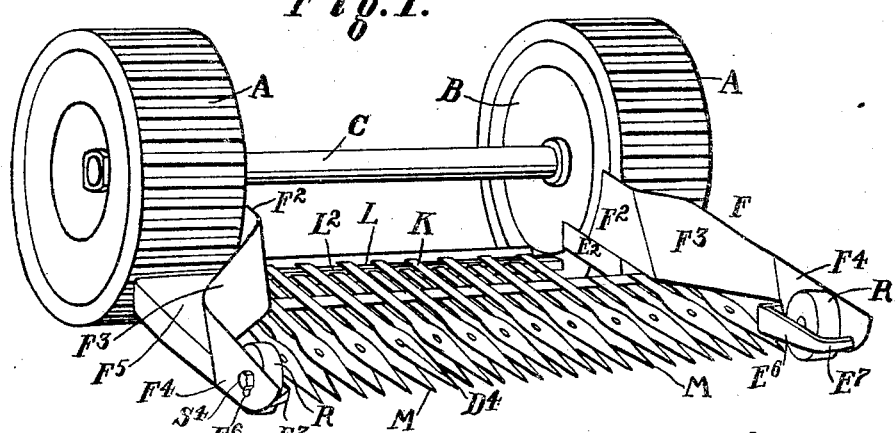
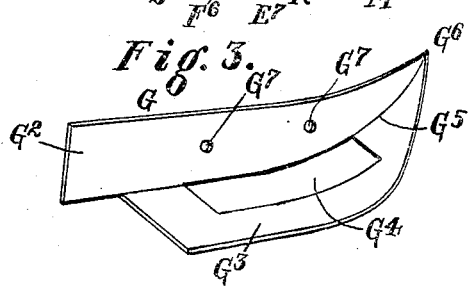
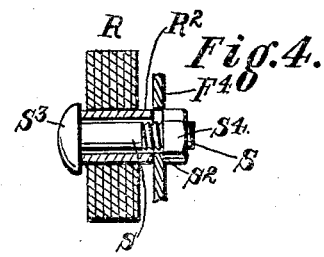

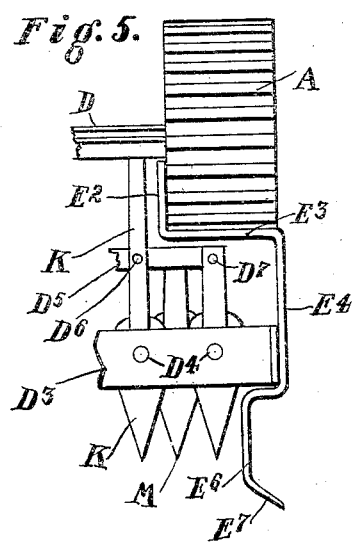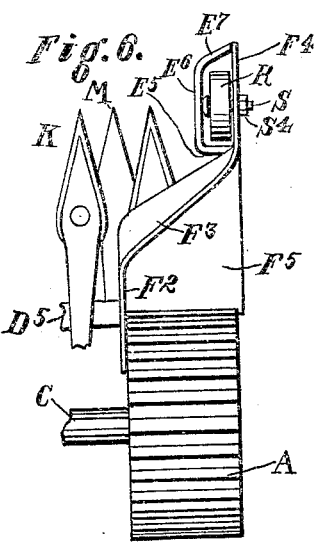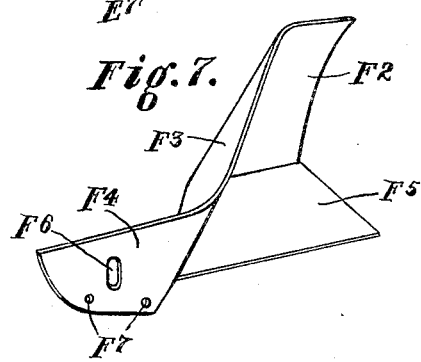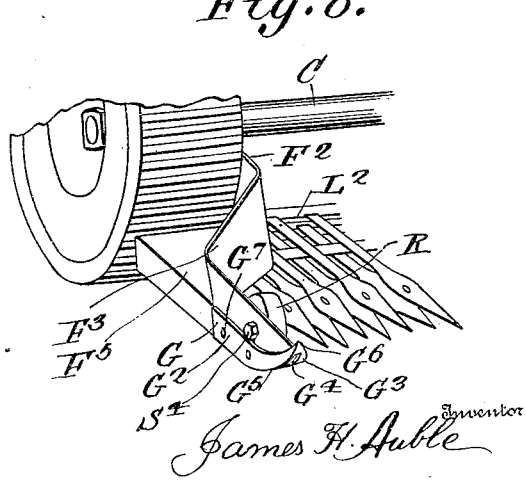

UNITED STATES PATENT OFFICE.

JAMES H. AUBLE, OF CINCINNATI, OHIO, ASSIGNOR OF TWO-THIRDS TO JACOB H. BROMWELL, OF WYOMING, OHIO, AND JAMES J. McDONALD, OF CINCINNATI, OHIO.

LAWN-MOWER.

No. 929,814.     Specification of Letters Patent.     Patented Aug. 3, 1909.

Application filed September 11, 1905. Serial No. 277,984.

*To all whom it may concern:*

Be it known that I, JAMES H. AUBLE, a citizen of the United States, and a resident of the city of Cincinnati, in the county of Hamilton and State of Ohio, have invented certain new and useful Improvements in Lawn-Mowers, of which the following is a specification.

My improvements relate to the running gear of a mower, and in general to novel and very useful constructions, to wit: first,—as to the conformation of the parts of the frame; secondly,—as to the material of which these parts are constructed; thirdly,—as to the parts relating to the front rollers, their construction, arrangement, the preferred material of them, and the combination of these front (ground) rollers with other adjacent parts of the machine; fourth,—as to the shield deflectors of the grass and rubbish, etc. These and other features and the various advantages resulting from their use conjointly or otherwise will be apparent from the following description and claims.

In the accompanying drawings making part of this application,—Figure 1 is a view in perspective of portions of a lawn mower illustrating my invention. Fig. 2 is a perspective view of a portion of the mower, after the knives, the rollers, certain parts connected with the rollers and the grass fenders or shields have been removed. Fig. 3 is a perspective view of a shoe (a deflector) for preventing the grass from getting up to the roller shaft and winding around the latter. Fig. 4 represents a vertical central section of either one of the front rollers, and of the outer portion (sleeve) of the shaft, and of that vertical side portion of the shield which supports the shaft of the roller. The central bolt of the shaft and the nut of the said bolt are shown in elevation. Fig. 5 is a top view of a portion of the machine at and near one end of the latter. In this view, the grass deflecting shield has been removed. Fig. 6 is a top view of a portion of the machine at and near one end, when the grass deflecting shield is in position. Fig. 7 represents, in perspective, one of these shields for deflecting the grass. Fig. 8 is a view in perspective of one of the actuating rollers and of the adjacent knives, and of the adjacent shield and the roller and of the shoe, the latter attached to the shoe, in working position. Figs. 3 and 4 are on a much larger scale than are the other figures.

In the drawings, similar characters of reference indicate corresponding parts.

I will now proceed to describe my invention in detail.

A, A, respectively indicate the rear supporting rollers.

B, B, respectively indicate disks respectively located at the inner sides of the rollers A, A.

C is a tube (*i. e.* hollow shaft) connecting the disks B, B. The rollers A, A are connected to a shaft which extends through the tube C. The disks B, B, are connected below by the guideway pieces D.

$D^2$ and $D^2$ respectively indicate guide boxes respectively fixed to the disks. Each guide box extends within the hollow roller A adjacent to it. There are rods in the guideways. One rod receives motion from one of the rollers A, and the other rod from the other roller A. One of these rods L is adapted to communicate motion to the upper tier of knives K, and the other of these rods $L^2$ communicates motion to the lower tier of knives M. Both tiers of knives are respectively pivoted at the places $D^4$ to the cross bar $D^3$.

In front of each rear roller A is a knife or knives. As the shanks of these last named knives cannot extend all the way back to the rods L, $L^2$, I connect the shanks of the upper knives of this kind to an adjacent long shank of a knife of the upper tier of knives by a link. Thus $D^5$ is a link pivoted at $D^6$ to the long shank of a knife of the upper tier, and also pivoted at $D^7$ to the short shank of a knife, which is located in the same tier, and directly in front of the adjacent roller A. Thereby as the knife with a long shank moves, it moves the short shank of the adjacent knife by means of the link.

That knife or those knives of the lower tier of knives, which by reason of being located in front of the rollers A, are similarly linked to the adjacent long shank of a knife in the lower tier of knives are thereby similarly moved.

As the construction of the means for operating the knives, and of the knives themselves, may so far as this present invention is concerned, be altered and changed at will, I will not dwell further upon these, but will now consider the primary portions of this invention.

At each side of the machine is a frame bar E. This bar is, at its rear end, at $E^8$, connected to the adjacent disk B. The frame then extends forward a length $E^2$. It then turns outward and in front of the roller for the length $E^3$. It then again turns and extends directly forward for the length $E^4$. It then turns inward for a short distance for the length $E^5$, and then extends forward for the length $E^6$. It then curves gradually and extends outward forming the length $E^7$. To the length $E^4$, and near the front end portion thereof the cross bar $D^3$ aforementioned is preferably attached. The ends of this cross bar $D^3$ are each bent into a flange, and connected to the adjacent frame bar E at $E^9$.

Directly upon each frame bar E is located a grass shield F. This grass shield consists of a vertical straight sheet or thin portion of material, preferably metal, extending forward in the line of the length $E^2$ of the frame bar E, but extending for the length $F^2$ farther forward than does the frame bar length $E^2$. The shield then extends obliquely forward, namely, it extends forward and outward for the length $F^3$. At the same time, this portion $F^3$ leans outward and backward, as shown. The shield is then extended forward and downward for the length $F^4$. The upper edge of this length $F^4$ is therefore preferably lower than the edge of the portion $F^2$ and of the portion $F^3$, except where the portion $F^3$ meets it. A horizontal part $F^5$ of the shield extends from the lower edge of the parts $F^2$ and $F^3$ outward as far as the parts $E^3$ and $E^4$ of the frame extend and covers these parts.

Between the part $F^4$ of the shield F and the portion $E^6$ of the frame E, the roller R is located.

The preferred mode of retaining the roller in place is as follows: The part $F^4$ of the shield F has in it a hole $F^6$. A sleeve $R^2$ is passed centrally through the roller R. Extending through this sleeve and through the hole $F^6$ of the part $F^4$ of the shield is a bolt S, having a head $S^3$. On the outer (screw) end of the bolt and outside of the part $F^4$ is a nut $S^4$. This nut is screwed tight against the part $F^4$. Thus the sleeve $R^2$ is clamped fixedly between the bolt head $S^3$ and the part $F^4$ of the shield. The bolt, the sleeve and the nut thus together become a strong fixed portion of the part $F^4$, and constitute a stable bearing for the roller R. The support for the roller may be connected to the frame $E^6$, but is preferably connected as heretofore mentioned. The hole $F^6$ is preferably elongated vertically. This elongation enables the roller shaft S and bearing to be adjusted up and down relatively to the shield and to the frame. By this adjustment, the height of the front portion of the machine can be adjusted relatively to the ground, and the height at which the grass is cut above the ground can be fixed.

I further provide a shoe-fender G. This consists of the vertical plate $G^2$ and the plate $G^3$ joined to the lower edge $G^5$ of the plate $G^2$. The forward portions of both of these plates $G^2$ and $G^3$ are tapered and together end in a point $G^6$. The plate $G^3$ at its forward end curves upward. In this plate $G^3$ is an opening $G^4$, which receives the roller R. This shoe G is connected to the part $F^4$ of the shield preferably by bolts, respectively passed through the openings $F^7$, $F^7$, of the part $F^4$ of the shield and through the openings $G^7$, $G^7$, of the part $G^2$ of the shoe-fender G. Fig. 8 shows this shoe in place at the part $F^4$ and in operative position.

The advantages of my invention are many. The presence of the shield and its shape serve to well deflect the grass that is beyond the reach of the knives so that it will not get in the way of the machine. The shield deflects the cut grass toward the central portion of the machine, in readiness to be delivered at the rear of the machine. The shield is constructed with a proper reference to the frame of the machine and to the conformation of the latter. The shoe-fender is also of great advantage as a guard and deflector at and in the neighborhood of the roller. The construction and the mode of attachment of the roller bearing is very simple, economical and efficacious.

A principal object of my invention has been to make most of the parts to which principal consideration has been directed, out of sheet metal. Thus while the shield and the shoe-fender can be otherwise made, they can be formed by being stamped into shape. And it is my intention thus to make them. So also the frame pieces E, E; the cross piece or bar $D^3$ with its end flanges $D^5$; the guides D and the parts $D^2$ and the disks B can be stamped into form. These and other advantages will be apparent from an inspection and a consideration of my invention.

What I claim as new, and of my invention and desire to secure by Letters Patent, is:—

1. In a lawn mowing machine, the main shaft, disks B, B, supported by said main shaft, the frame pieces, E E, respectively connected at their rear ends to disks B, B, the said frame pieces each consisting of the parts $E^2$, $E^3$, $E^4$, $E^5$, and $E^6$ and $E^7$, the part $E^3$ joined at one end to the part $E^2$, at an angle, and its other end to the part $E^4$ at an angle, part $E^5$ joined at one end to the part $E^4$ at an angle and joined at its other end to the part $E^6$ at an angle, and the terminal portion $E^7$ extending outwardly at an angle to the part $E^6$, substantially as and for the purposes specified.

2. In a lawn mowing machine, the main shaft, disks B, B, supported by said main shaft, the frame pieces E, E, respectively connected at their rear ends to disks B, B, the said frame pieces each consisting of the parts $E^2$, $E^3$, $E^4$, $E^5$, and $E^6$ and $E^7$, the part $E^3$ joined at one end to the part $E^2$, at an angle, and at its other end to the part $E^4$ at an angle, part $E^5$ joined at one end to the part $E^4$ at an angle and joined at its other end to the part $E^6$ at an angle, and the terminal portion $E^7$ extending outwardly at an angle to the part $E^6$, in combination with the cross bar $D^3$ provided at each end with a flange, and at said flange united to the adjacent frame piece E, substantially as and for the purposes specified.

3. In a lawn mower, the main shaft, the rear wheels, the disks supported by this main shaft, the lower frame pieces, each beginning at the said disks, and extending forward as at $E^2$, and then out at an angle as at $E^3$ in front of the adjacent one of the said rear wheels, then forward as at $E^4$, a cross bar $D^3$, the frame piece at $E^4$ connected to the adjacent end of this cross bar, the frame piece E then extending inward at an angle as at $E^5$, and then extending forward as at $E^6$, and then outward as at $E^7$, the forward roller R located in the space bounded by the parts $E^5$, $E^6$, $E^7$, and the knives located in the corner space bounded by the parts $E^3$, $E^4$, substantially as and for the purposes specified.

4. In a lawn mower, the combination of the frame, and the shield F, having the rear vertical forwardly extending portion $F^2$, and the portion $F^3$ extending forward and outward and obliquely to a vertical plane, and the forwardly extending portion $F^4$, substantially as and for the purposes specified.

5. In a lawn mower, the combination of the rear wheels, and the frame, and the shield F having the rear vertically and forwardly extending portion $F^2$, and the portion $F^3$ extending forward and outward from the plane of the portion $F^2$ and obliquely to a vertical plane, the forwardly extending portion $F^4$ and a broad horizontal portion $F^5$ extending in front of the adjacent rear wheel and extending to the parts $E^3$ and $E^4$ of the adjacent frame, substantially as and for the purposes specified.

6. In a lawn mower, the forward rollers the side frames extending forward, then sidewise outwardly, then forward, then sidewise inwardly, then forward and outward, and the shields each extending forward, then forward and outward and obliquely to a vertical plane, then forward, and together with the forward end portion of the adjacent frame forming an inclosure, each of the said shields being a support for the adjacent forward roller, and the said shield and accompanying forward end portion of the frame constituting guards for the said forward roller, substantially as and for the purposes specified.

7. In a lawn mower, the front roller, and the bearing sleeve extended through it, and the bolt passing through the sleeve, this bearing sleeve held between the bolt head and an adjacent supporting portion of the frame, in combination with a shoe having a vertical plate and a lower plate extending inwardly from said vertical plate and provided with an upwardly extending front part for keeping the grass away from the roller, the said last named plate provided with a slot $G^4$ through which the lower portion of the roller extends down, substantially as and for the purposes specified.

8. In a lawn mower, the frame whose side pieces have the inwardly extending length $E^5$, and extending forward therefrom the length $E^6$ bent outwardly into the length $E^7$, and the shield having the forward length $F^4$, forming with the frame lengths $E^5$, $E^6$, $E^7$, an inclosure, a roller R located within said inclosure, a bearing sleeve within the roller, a bolt through the sleeve, and through the length $F^4$, the bolt holding the sleeve fixed between the bolt end and the length $F^4$, in combination with a shoe having the bottom $G^3$ provided with an aperture through which the roller R extends to the ground, substantially as and for the purposes specified.

9. In a lawn mower, the frame whose side pieces have the inwardly extending length $E^5$, and extending forward therefrom the length $E^6$ bent outwardly into the length $E^7$, and the shield having the forward length $F^4$, forming with the frame lengths $E^5$, $E^6$, $E^7$, an inclosure, a roller R located within said inclosure, a bearing sleeve within the roller, a bolt through the sleeve, and through the length $F^4$, the bolt holding the sleeve fixed between the bolt end and the length $F^4$, the opening in the length shield $F^4$, in which the bolt is received, being elongated, in combination with a shoe having a bottom $G^3$ provided with an aperture $G^4$, through which the roller extends to the ground, the bottom $G^3$ being bent up in front, and a plate or flange $G^2$, attached to the portion $F^4$, with which the bottom $G^3$ is united, substantially as and for the purposes specified.

10. In a lawn mowing machine, the side frames, each having rear portion $E^2$, outwardly extending portion $E^3$, forwardly extending portion $E^4$, inwardly extending portion $E^5$, forwardly extending portion $E^6$, and outwardly bent terminal portion $E^7$, and the shields, each having the vertical rear portion $F^2$, outwardly and forwardly extending portion $F^3$, flat horizontal portion $F^5$ united to the portions $F^2$ and $F^3$, forwardly extending portion $F^4$, roller R located between the parts $F^4$ and $E^5$, $E^6$, and $E^7$, and having bearing sleeve $R^2$, bolt S therein, bolted to the part $F^4$, substantially as and for the purposes specified.

11. In a lawn mowing machine, the side frames, each having rear portion $E^2$, outwardly extending portion $E^3$, forward extending portion $E^4$, inwardly extending portion $E^5$, forwardly extending portion $E^6$, and outwardly bent terminal portion $E^7$, the cross brace $D^3$ united to the frame at parts $E^4$, and the shields, each having the vertical rear portion $F^2$, outwardly and forwardly extending portion $F^3$, flat horizontal portion $F^5$ united to the portions $F^2$ and $F^3$, forwardly extending portions $F^4$, roller R located between the parts $F^4$ and $E^5$, $E^6$ and $E^7$, and having bearing sleeve $R^2$, bolt S therein, bolted to the part $F^4$, substantially as and for the purposes specified.

12. In a lawn mower, the front roller the shield, the piece $F^4$ thereof extending forward, and there provided with the shoe-fender G having a side piece $G^2$, for attachment to the piece $F^4$, and the bottom piece $G^3$, this piece $G^3$ having the opening in which the front roller is located, the shoe being curved upwardly at front, substantially as and for the purposes specified.

13. In a lawn mower, a forward roller, a shoe-fender G having the side $G^2$ and the bottom $G^3$, both at their forward ends tapered, the front portion of the bottom curving upward and the shoe ending in this terminal taper, the bottom having the recess $G^4$ for the reception of this forward roller, substantially as and for the purposes specified.

14. In a lawn mower, a forward roller, a shield, the piece $F^4$ of the shield extending forward, and the frame having the pieces $E^6$, $E^7$, opposite the shield piece $F^4$, the roller located in the space there formed, a shoe-fender combined with the shield, and having a bottom provided with an opening in which the roller is located, the front inclining upward and forward, and the bottom in conjunction with the frame and shield fully guarding the roller, and fending off the grass, and the like from the roller, substantially as and for the purposes specified.

15. In a lawn mower, forward rollers, the rear rollers, side frames extended forward and near their forward ends provided with a terminal portion $E^6$, $E^7$, and the shields, each provided with horizontal parts in front of the rear rollers and with rear vertical portions, and in front of said vertical portions parts whose planes are inclined forwardly and outwardly to the planes of the said vertical portions, and then portions in front of these inclined portions forming with the terminal portions of the frame complementary sides of the inclosures in which the front rollers are, and the shoe-fenders having slotted bottoms through which said rollers extend, and which form bottoms for the said inclosures for the exclusion of grasses, rubbish, dirt, etc., substantially as and for the purposes specified.

16. In a lawn mower, the main shaft, the rear wheels, the disks supported by this main shaft, the lower frame pieces, each beginning at the said disks, and extending forward as at $E^2$, and then out at an angle as at $E^3$ in front of the adjacent one of the said rear wheels, then forward as at $E^4$, a cross bar $D^3$, the frame piece at $E^4$ connected to the adjacent end of this cross bar, the frame piece E then extending inward at an angle as at $E^5$, and then extending forward as at $E^6$, and then outward as at $E^7$, the forward roller R located in the space bounded by the parts $E^5$, $E^6$, $E^7$, and knives located in the corner space bounded by the parts $E^3$ and $E^4$, and knives in the central knife space between these corner spaces, the shanks of the knives located in the corner space being linked to a knife or knives in the central space, substantially as and for the purposes specified.

In witness whereof I have set my hand to this specification, in the presence of two subscribing witnesses.

JAMES H. AUBLE.

Witnesses:
JOHN E. FITZPATRICK,
K. SMITH.